United States Patent
Karasawa

(10) Patent No.: US 8,000,591 B2
(45) Date of Patent: Aug. 16, 2011

(54) AUTOMATIC FOCUSING APPARATUS

(75) Inventor: Katsumi Karasawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/769,191

(22) Filed: Apr. 28, 2010

(65) Prior Publication Data

US 2010/0278520 A1    Nov. 4, 2010

(30) Foreign Application Priority Data

Apr. 30, 2009  (JP) .................. 2009-110868

(51) Int. Cl.
G03B 3/10    (2006.01)
(52) U.S. Cl. ......................................... 396/95; 396/96
(58) Field of Classification Search .................. 396/95, 396/96, 133, 135
See application file for complete search history.

(56) References Cited

U.S. PATENT DOCUMENTS

| | | | |
|---|---|---|---|
| 5,053,801 A | | 10/1991 | Ishida et al. |
| 5,061,953 A | * | 10/1991 | Higashihara et al. ........... 396/95 |
| 5,151,732 A | | 9/1992 | Akashi et al. |
| 5,652,924 A | | 7/1997 | Yamano |
| 5,664,237 A | | 9/1997 | Watanabe |
| 6,404,986 B1 | | 6/2002 | Morikawa |
| 2004/0223073 A1 | | 11/2004 | Kanai |
| 2006/0104621 A1 | * | 5/2006 | Nakata ........................... 396/96 |

FOREIGN PATENT DOCUMENTS

| | | |
|---|---|---|
| EP | 0 427 292 A2 | 5/1991 |
| EP | 1 037 086 A2 | 9/2000 |
| GB | 2 223 139 A | 3/1990 |
| JP | 4-217237 A | 8/1992 |
| JP | 8-101337 A | 4/1996 |

OTHER PUBLICATIONS

Karasawa, Katsumi. "Automatic Focusing Apparatus", Specification and Drawings of unpublished related co-pending U.S. Appl. No. 12/769,223, filed Apr. 28, 2010. pp. 1-31.
Extended European Search Report issued in European Patent Application No. 10160591.3 dated Jul. 21, 2010 issued in related co-pending U.S. Appl. No. 12/769,223.

* cited by examiner

*Primary Examiner* — Clayton E Laballe
*Assistant Examiner* — Dennis Hancock
(74) *Attorney, Agent, or Firm* — Rossi, Kimms & McDowell LLP

(57) ABSTRACT

An automatic focusing apparatus includes: a focus detector photoelectrically converting at least a part of a photographing beam; a defocus computer calculating a defocus amount based on an output of the focus detector; a driver driving a focus lens based on the defocus amount; and a unit setting a maximum time period for charge accumulation in the focus detector. If the accumulated charge in the focus detector reaches a threshold within the period, when the accumulated charge in the focus detector reaches the threshold, the defocus computer calculates a defocus amount using an output of the focus detector and outputs the defocus amount to the driver. If the accumulated charge in the focus detector does not reach the threshold within the period, when the period lapses, the defocus computer calculates a defocus amount using an output of the focus detector and outputs the defocus amount to the driver.

3 Claims, 9 Drawing Sheets

AUTOMATIC FOCUSING APPARATUS

BACKGROUND OF THE INVENTION

1. Field of the Invention

The present invention relates to optical apparatuses such as a television lens and a video lens, and, more particularly to an optical apparatus having an automatic focus function.

2. Description of the Related Art

Conventionally, various automatic focus (AF) techniques in imaging apparatuses such as a camera and a video camera have been proposed. For example, light beams from an object that have passed different exit pupil regions of a photographing lens are imaged on a pair of line sensors and a relative position displacement amount of a pair of image signals obtained by photoelectrically converting object images is calculated. An automatic focusing method for calculating a defocus amount of the object on the basis of the displacement amount and performing driving of the photographing lens is well known.

In moving image photographing, it is necessary to control the position of a focus lens to automatically perform focusing constantly.

Japanese Patent Application Laid-Open No. H04-217237 discloses a method of predicting, when it is temporarily impossible to perform focus detection, a moving position of an object based on the moving speed of the object in the past and maintaining a focus state.

Japanese Patent Application Laid-Open No. H08-101337 discloses a method of adaptively switching lens driving according to a focus detection result in order to obtain a focus state.

However, in the related arts disclosed in Japanese Patent Application Laid-Open No. H04-217237 and Japanese Patent Application Laid-Open No. H08-101337, it is impossible to constantly maintain the focus state in various photographing environments during taking moving images. It is difficult to instantaneously perform focus adjustment on different objects when panning or the like.

A focus detection unit images a light beam from an object on a line sensor and photoelectrically converts an object image. Therefore, time required for accumulation of charges (hereinafter referred to as charge accumulation) of the sensor is different depending on condition such as brightness of the object.

FIG. 9 shows a change in distance between a photographing lens and an object moving toward the photographing lens (moving upwardly in FIG. 9) as the time changes t1 to t7 and a change in distance in focus of the photographing lens (distance between the photographing lens and an object in focus) with respect to the time t1 to t7. In the figure, the ordinate represents a distance and the abscissa represents time. In the figure, a focal length of a focus lens at the time of focus on the object changes from P1 to P3 with respect to time t1 to time t7. At time t1, the focus lens is in a state of the focal length P1, the sensor is activated, and the charge accumulation is started. At time t2, the charge accumulation of the sensor is completed.

When the charge accumulation of the sensor is completed, data based on charges accumulated in the sensor is read and a defocus amount is calculated. At time t3, a defocus lens driving signal 801 is output to set a focal length of the focus lens to P2.

The focus lens traces a locus illustrated in the figure according to the driving signal 801, fits within depth of field, and can maintain the focus state. From time t3, the focus lens is driven. The focus lens stops when the focus lens is driven to obtain the focal length P2 as a target position.

However, when the contrast of the object falls, at time t3, the focus lens is stopped in a state of the focal length P2. When the charge accumulation takes time until time t6, update of a control signal for driving the focus lens is kept waited until time t7. Therefore, at time t7 when a signal 802 for driving the focus lens is output, the focus lens substantially deviates from the depth of field and cannot maintain the focus state. In such a phenomenon, as moving speed of the object is higher, time when the focus lens deviates from the depth of field is earlier. Therefore, it is more difficult to maintain the focus state.

As an object distance is shorter or the focal length of the lens is larger, the depth of field is smaller and it is more difficult to maintain the focus state.

SUMMARY OF THE INVENTION

Therefore, it is an object of the present invention to provide an automatic focusing apparatus that enables to maintain a focus state irrespectively of various photographing environments and speed of an object.

An automatic focusing apparatus according to the present invention includes: a focus detection unit that photoelectrically converts at least a part of a photographing light beam; a defocus computing unit that calculates a defocus amount on the basis of an output of the focus detection unit; a drive unit that drives a focus lens on the basis of the defocus amount; and a unit that sets a maximum accumulating time period that can be consumed for accumulation of charges in the focus detection unit. When an accumulation amount of charges in the focus detection unit reaches a threshold value within the maximum accumulating time period, at a time when the accumulation amount of charges in the focus detection unit reaches the threshold value, the defocus computing unit calculates a defocus amount using an output of the focus detection unit and outputs the defocus amount to the drive unit and, when the accumulation amount of charges in the focus detection unit does not reach the threshold value within the maximum accumulating time period, at a time when the maximum accumulating time period lapses, the defocus computing unit calculates a defocus amount using an output of the focus detection unit and outputs the defocus amount to the drive unit.

According to the present invention, it is possible to constantly maintain a focus state with respect to an object irrespectively of a photographing environment and object speed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
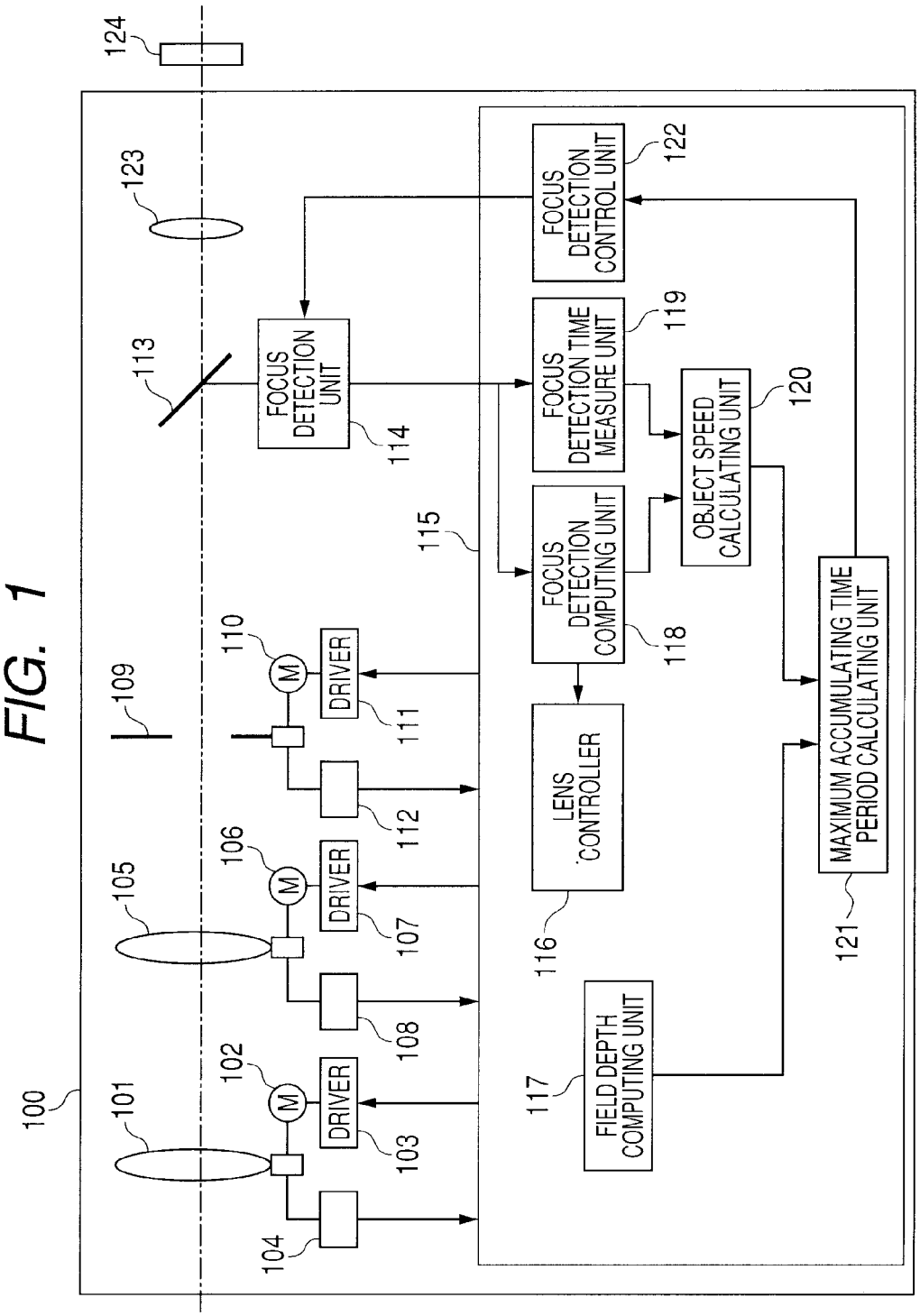
FIG. 1 is a diagram of a first embodiment.

FIG. 1 illustrates the configuration of a zoom lens apparatus 100 that is a first embodiment of an automatic focusing apparatus according to the present invention. The zoom lens apparatus 100 includes a focus lens 101 which moves in an optical axis direction so as to change the position of an imaging plane of the zoom lens apparatus 100.

A focus motor 102 is connected to the focus lens 101. The focus motor 102 is driven by a focus driver 103 and moves the focus lens 101 in the optical axis direction. The position of the focus lens 101 is detected by a focus position detection unit 104.

The zoom lens 105 moves in the optical axis direction and changes focal length of the zoom lens apparatus 100. A zoom motor 106 is connected to the zoom lens 105. The zoom motor 106 is driven by the zoom driver 107 and moves the zoom lens 105 in the optical axis direction. The position of the zoom lens 105 is detected by a zoom position detection unit 108.

An iris motor 110 is connected to a movable stop 109. The iris motor 110 is driven by an iris driver 111 and drives the movable stop 109. The position of the movable stop 109 is detected by an iris position detection unit 112.

A spectral prism 113 divides light that has passed through the focus lens 101 and the zoom lens 105 into two light beams. One light beam which is transmitted through the spectral prism 113 passes through a relay lens 123 and is made incident on an image pickup element 124. The other light beam which is reflected by the spectral prism 113 is made incident on a focus detection unit 114. The focus detection unit 114 includes a phase difference detection lens and a phase difference detection sensor. The focus detection unit 114 photoelectrically converts a pair of images (two images), which is formed by the two light beams divided by the phase difference detection lens, with a phase difference sensor.

A zoom lens controller 115 includes a lens control unit 116 that drives the focus lens 101 on the basis of a result of a focus detection computing unit 118 and controls the zoom lens 105 and the movable stop 109.

A field depth computing unit 117 calculates depth of field in the present focus position based on the position information received from the focus position detection unit 104, the zoom position detection unit 108, and the iris position detection unit 112 (or may read out the depth of field from a table). The focus detection computing unit 118 (a defocus computing unit) calculates a phase difference of a pair of image signals that is a part of a photographing light beam photoelectrically converted by the focus detection unit 114 and calculates a defocus amount. A focus detection time measuring unit 119 measures charge accumulating time of the phase difference sensor of the focus detection unit 114. An object speed calculation unit 120 calculates moving speed in the optical axis direction of an object on the basis of information received from the focus detection computing unit 118 and the focus detection time measuring unit 119. A maximum accumulating time period calculation unit 121 calculates a maximum charge accumulating time period (i.e., a maximum focus detection time period) of a sensor, in which the focus can be controlled within the depth of field, based on the depth of field information received from the field depth computing unit 117 and the object speed received from the object speed calculation unit 120 (or may read out the maximum accumulating time period from a table). A focus detection control unit 122 switches the control of the phase difference sensor according to the maximum charge accumulating time period calculated by the maximum accumulating time period calculation unit 121.

A method of controlling the phase difference sensor is described in detail below with reference to a flowchart of FIG. 2 and a locus of focal length of a lens illustrated in FIG. 3 in the configuration described above.

Figure 2:
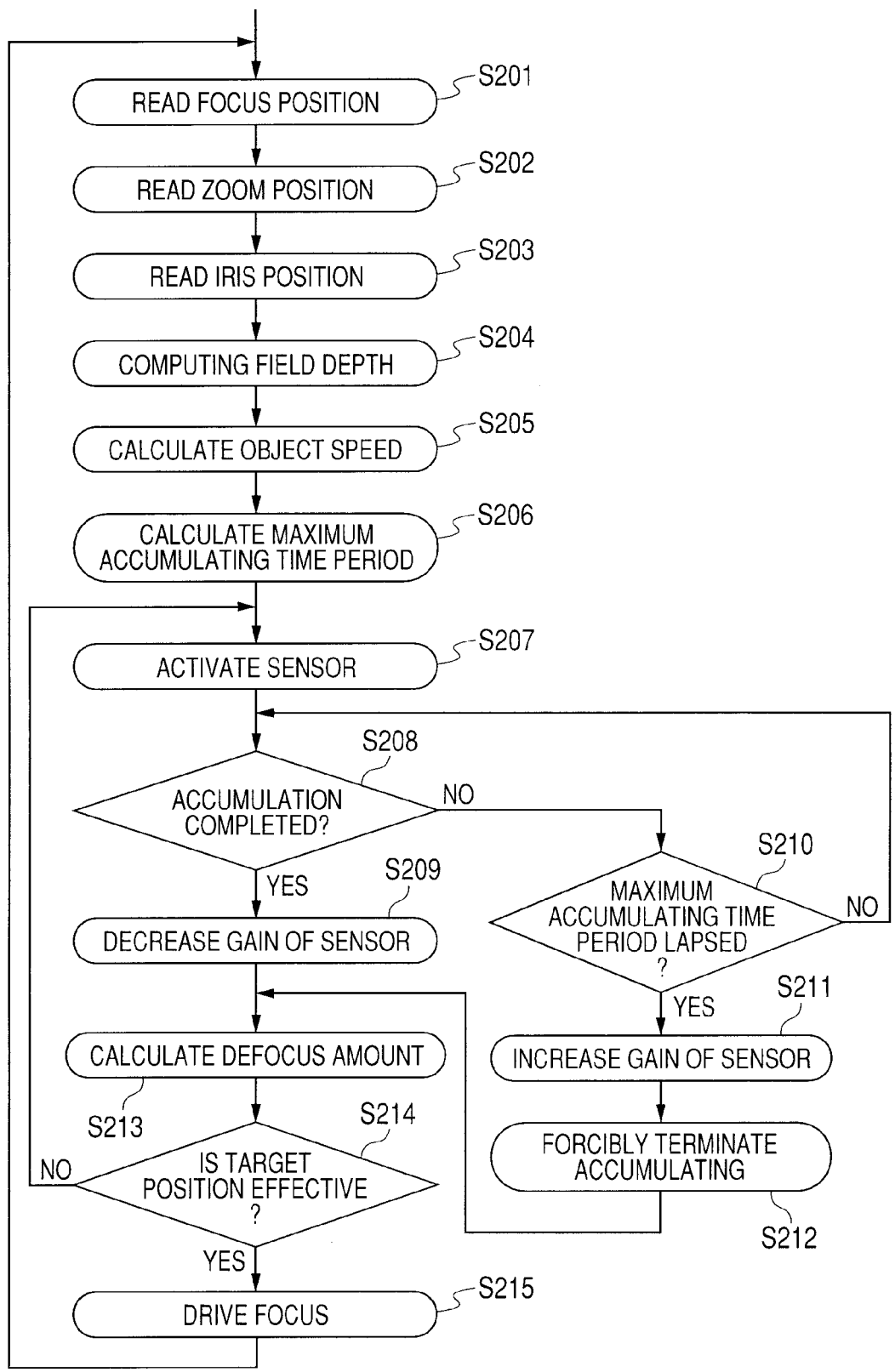
FIG. 2 is a flowchart of the first embodiment.

In step S201 in FIG. 2, the zoom lens controller 115 reads focus position detected by the focus position detection unit 104. In step S202, the zoom lens controller 115 reads zoom position detected by the zoom position detection unit 108. In step S203, the zoom lens controller 115 reads iris position detected by the iris position detection unit 112. In step S204, the zoom lens controller 115 calculates front and rear depths of field according to the following expression based on the focus position information read in step S201, the zoom position information read in step S202, and the iris position information read in step S203:

front depth of field $d2 = \sigma \times Fno \times L^2 / f^2 \sigma \times Fno \times L$ rear depth of field $d1 = \sigma \times Fno \times L^2 / f^2 + \sigma \times Fno \times L$ where $\sigma$ represents a permissible circle of confusion, f represents focal length, L represents an object distance, and Fno represents an F number. The depth of field is described as being calculated by the above expression. However, the present invention is not limited to this. The depth of field may be read out from a table or the like.

Figure 3:
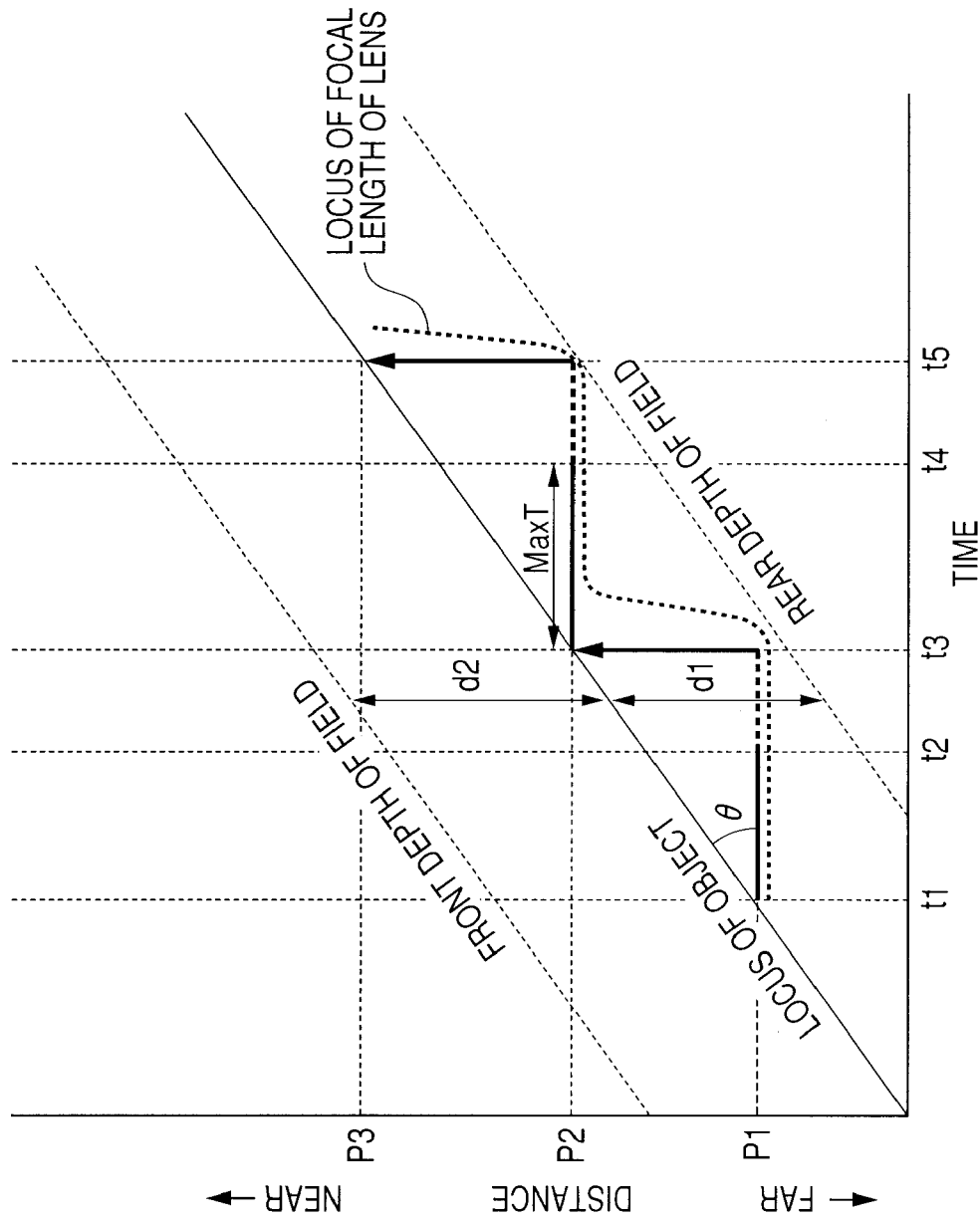
FIG. 3 is a locus of focal length of a lens to which the first and second embodiments are applied.

FIG. 3 shows a change in distance between a photographing lens and an object moving toward the photographing lens (moving upwardly in FIG. 3) as the time changes t1 to t5 and a change in distance in focus of the photographing lens (distance between the photographing lens and an object in focus) with respect to the time t1 to t5.

In step S205, the zoom lens controller 115 calculates object speed $\theta$ defined by the following expression on the basis of processing time period T (time period between t1 and t3 in FIG. 3), which is a total of charge accumulating time period of the sensor and time period necessary for calculation of a defocus amount, and an amount of change (P2−P1 in FIG. 3) in the focal length of the focus lens (or may be read out from a table):

processing time period T=charge accumulating time period of the sensor+defocus amount calculation time period object speed $\theta$=A tan (an amount of change in the focal length of the focus lens/processing time period T)

In step S206, the zoom lens controller 115 calculates a maximum accumulating time period (a maximum focus detection time period) MaxT (time period between t3 and t4 in FIG. 3) according to the following expression from the depth of field calculated in step S204 and the object speed $\theta$ calculated in step S205. The zoom lens apparatus 100 shifts to step S207.

When the object is moving toward a close side, the maximum accumulating time period MaxT can be expressed as follows.

MaxT=$(d1-\Delta 1)$/tan $\theta$−defocus amount calculation time period

When the object is moving toward an infinity side, the maximum accumulating time period MaxT can be expressed as follows.

MaxT=$(d2-\Delta 2)$/tan $\theta$−defocus amount calculation time period where d1 represents rear depth of field and d2 represents front depth of field. Δ1 and Δ2 are constants for maintaining a focus state within the depth of field.

In step S207, the zoom lens controller 115 activates the phase difference sensor, starts charge accumulation, and shifts to step S208. In step S208, whether the charge accumulation of the sensor is completed is determined. When the charge accumulation is not completed (a charge accumulation amount in the sensor has not reached the threshold value), proceeding to step S210. When the charge accumulation is completed (at a point when the charge accumulation amount in the sensor reaches the threshold value), proceeding to step S209. In step S210, whether charge accumulating time period of the sensor has exceeded the maximum accumulating time period MaxT is determined. When the charge accumulating time period has not exceeded the maximum accumulating time period MaxT, the process returns to step S208 and monitors a charge accumulation state again. At a time when the accumulating time period of the sensor exceeds the maximum accumulating time period MaxT (if the charge accumulation amount in the sensor does not reach the threshold value within the maximum accumulation time period), the process shifts to step S211. In step S211, since the charge accumulating time period of the sensor has exceeded the maximum accumulating time period, it is understood that the contrast of the object is low. Therefore, the zoom lens controller 115 increases a gain of the sensor and increases detection sensitivity in order to reduce the charge accumulating time and shifts to step S212. In step S212, the charge accumulation of the sensor is forcibly terminated and the process proceeds to step S213. In step S209, since the charge accumulation is completed (the charge accumulation amount has reached the threshold value) before the charge accumulating time period reaches the maximum accumulating time period, the zoom lens controller 115 reduces the gain of the sensor and reduces the detection sensitivity in order to improve detection accuracy of the sensor and proceeds to step S213. In step S213, the zoom lens apparatus 100 calculates a defocus amount from a sensor output, calculates a focus drive amount, and shifts to step S214. In step S214, the zoom lens controller 115 compares waveforms of the pair of image signals photoelectrically converted by the phase difference sensor and used for the calculation of the phase difference. When it is determined that the waveforms are effective waveforms according to a predetermined determination method, the focus drive amount calculated in step S213 is determined effective and the process proceeds to step S215. When it is determined in step S214 that the waveforms of the pair of image signals are not effective waveforms, the focus drive amount calculated in step S213 is determined ineffective, and the process returns to step S207 to activate the phase difference sensor again and start charge accumulation.

In step S215, after driving the focus lens according to the focus drive amount calculated in step S214, the process returns to step S201 and repeats the series of operation.

As described above, according to this embodiment, it is possible to maintain the in-focus state by controlling the charge accumulation based on the moving speed of the object and the depth of field and adjusting a focus control period.

Second Embodiment

Figure 4:
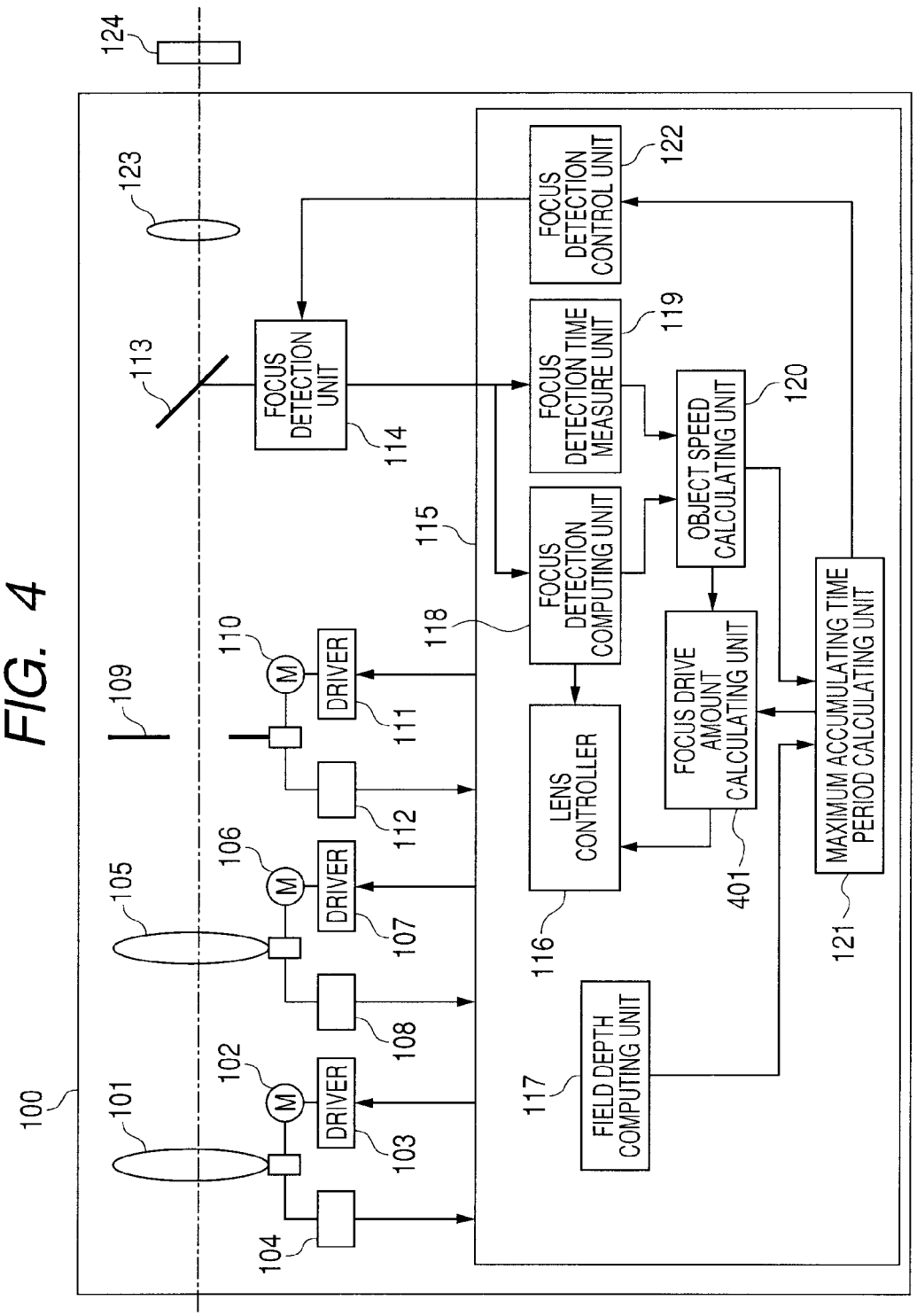
FIG. 4 is a diagram of a second embodiment.

FIG. 4 is a diagram of a second embodiment of the present invention. Description of components same as those in the first embodiment illustrated in FIG. 1 is omitted. Differences from the first embodiment are described below.

A focus drive amount calculation unit 401 calculates an extrapolated drive amount of a focus lens based on a maximum accumulating time period that is an output of the maximum accumulating time period calculation unit 121 and object speed that is an output of the object speed calculation unit 120.

Figure 5:
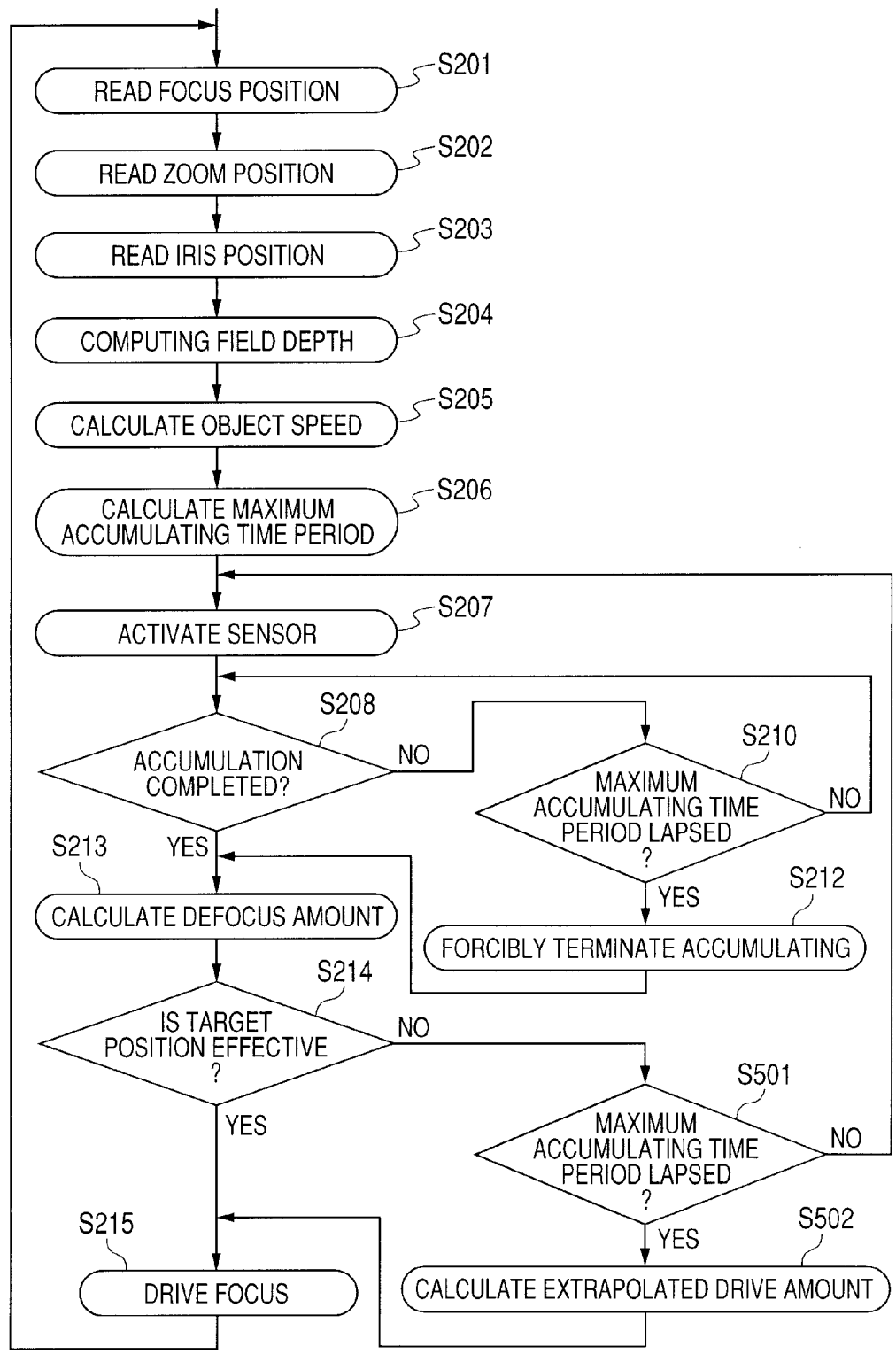
FIG. 5 is a flowchart of the second embodiment.

Operation in this configuration is described in detail with reference to a flowchart of FIG. 5 and a locus of focal length of a lens illustrated in FIG. 3. In FIG. 5, steps S201 to S207 are the same as those in the flowchart of FIG. 2, description of the steps is omitted.

In step S208, whether the charge accumulation of the sensor is completed is determined. When the charge accumulation is not completed (the charge accumulation amount has not reached the threshold value), the process proceeds to step S210. When the charge accumulation is completed (the charge accumulation amount has reached the threshold value), the process proceeds to step S213. In step S210, whether charge accumulating time period has exceeded the maximum accumulating time period MaxT is determined. When the charge accumulating time period has not exceeded the maximum accumulating time period MaxT, the process returns to step S208 and monitors a charge accumulation state again. When the charge accumulating time period has exceeded the maximum accumulating time period MaxT (the charge accumulation amount in the sensor does not reach the threshold value within the maximum accumulating time period), the process proceeds to step S212. In step S212, the charge accumulation of the sensor is forcibly terminated and the process proceeds to step S213. In step S213, a defocus amount is calculated based on a sensor output to calculate a focus drive amount, and the process proceeds to step S214.

In step S214, as in the case of the first embodiment, on the basis of waveforms of the pair of image signals photoelectrically converted by the phase difference sensor and used for the calculation of the phase difference, whether the focus drive amount calculated in step S213 is effective is determined. When the focus drive amount is effective, the process proceeds to step S215. When the focus drive amount is ineffective, the process proceeds to step S501.

In step S501, whether charge accumulating time period has exceeded the maximum accumulating time period MaxT is determined. When the charge accumulating time period has not exceeded the maximum accumulating time period MaxT, the process returns to step S207 to activate the phase difference sensor again and resume the charge accumulation. When the charge accumulating time period has exceeded the maximum accumulating time period MaxT (the charge accumulation amount in the sensor does not reach the threshold value within the maximum accumulating time period), the process proceeds to step S502. In step S502, the zoom lens controller 115 calculates, in the focus drive amount calculation unit 401 (an extrapolated drive computing unit), an extrapolated drive amount according to the following expression on the basis of the object speed θ calculated by the object speed calculation unit 120 illustrated in FIG. 4 and the maximum accumulating time period MaxT calculated by the maximum accumulating time period calculation unit 121. The extrapolated drive amount of the focus lens is a drive amount obtained by extrapolating a drive amount of the focus lens between time t3 and time t5 necessary for obtaining a focus state at time t5 from drive amounts of the focus lens at time t1 and time t3.

Processing time T=maximum accumulating time period MaxT+defocus amount calculation time period Extrapolated drive amount=tan θ×processing time period T In the next step S215, when it is determined in step S214 that the focus drive amount is effective, the focus lens is driven according to the focus drive amount calculated in step S213. When it is determined in step S214 that the focus drive amount is ineffective, the focus lens is driven according to the extrapolated drive amount calculated in step S502.

After driving the focus lens in step S215, the process returns to step S201 and repeats the series of operation.

As described above, in this embodiment, the maximum accumulating time period of the sensor is calculated from the moving speed of the object and the depth of field. When the accumulating time period has not exceeded the maximum accumulating time period, i.e., within a time period in which the focus state can be maintained within the depth of field, the focus lens is driven on the basis of the sensor output. When the accumulating time period has exceeded the maximum accumulating time period, the focus lens is driven by using the extrapolated drive amount calculated from the object speed. Consequently, even when a focus of the object cannot be temporarily detected, it is possible to maintain the in-focus state.

The above description is made on the premise that the object speed θ, the maximum accumulating time period MaxT, and the extrapolated drive amount of the focus lens are calculated. However, the present invention is not limited to this. The object speed θ, the maximum accumulating time period MaxT, and the extrapolated drive amount of the focus lens may be read out from a table or the like and set.

Third Embodiment

Figure 6:
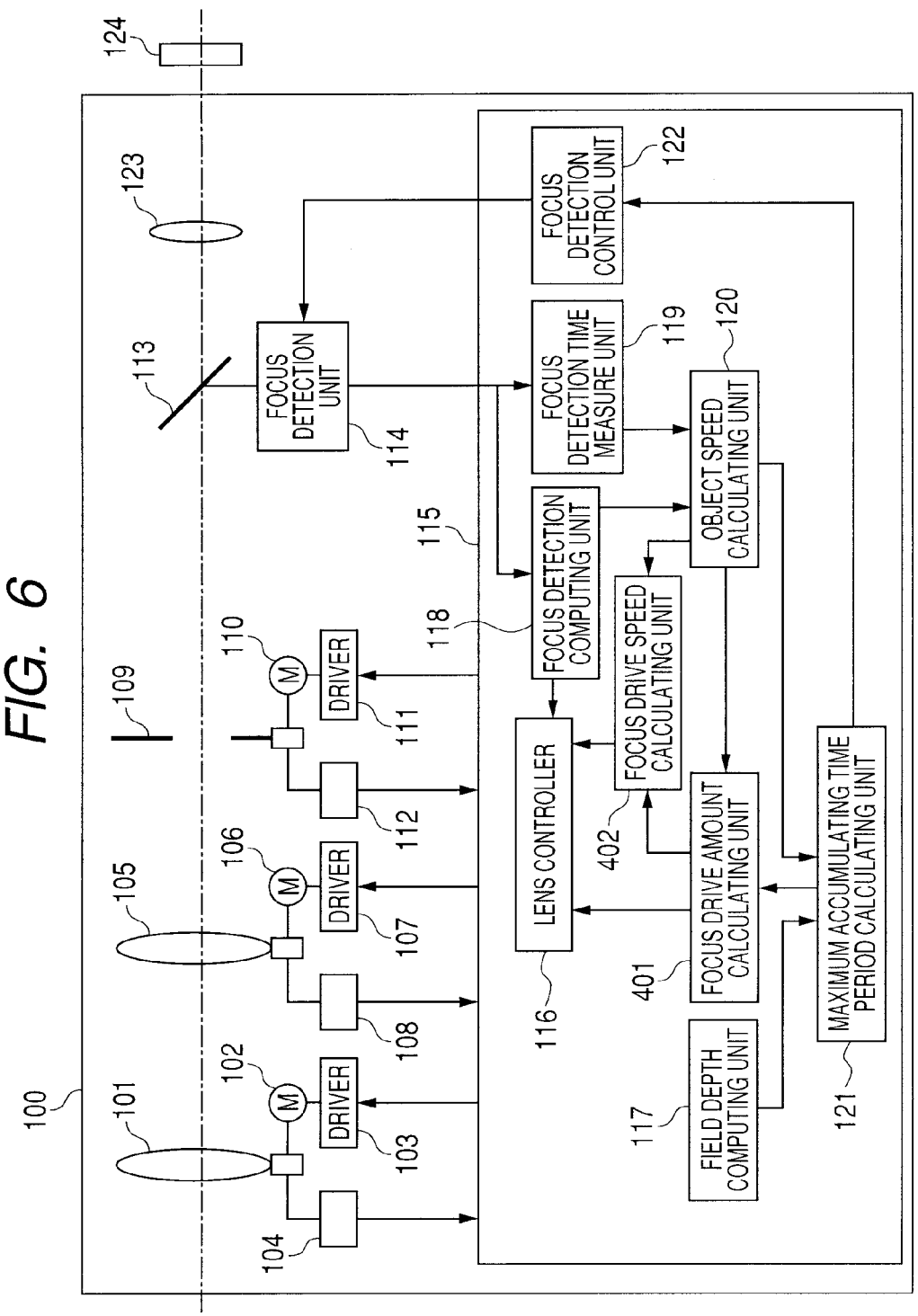
FIG. 6 is a diagram of a third embodiment.

FIG. 6 is a diagram of a third embodiment of the present invention.

The configuration of the third embodiment illustrated in FIG. 6 includes a focus drive speed calculation unit 402 in addition to the configuration of the second embodiment illustrated in FIG. 4. The other components are the same as those in the second embodiment. Therefore, description of the same components as that in the second embodiment is omitted to avoid redundancy.

Figure 7:
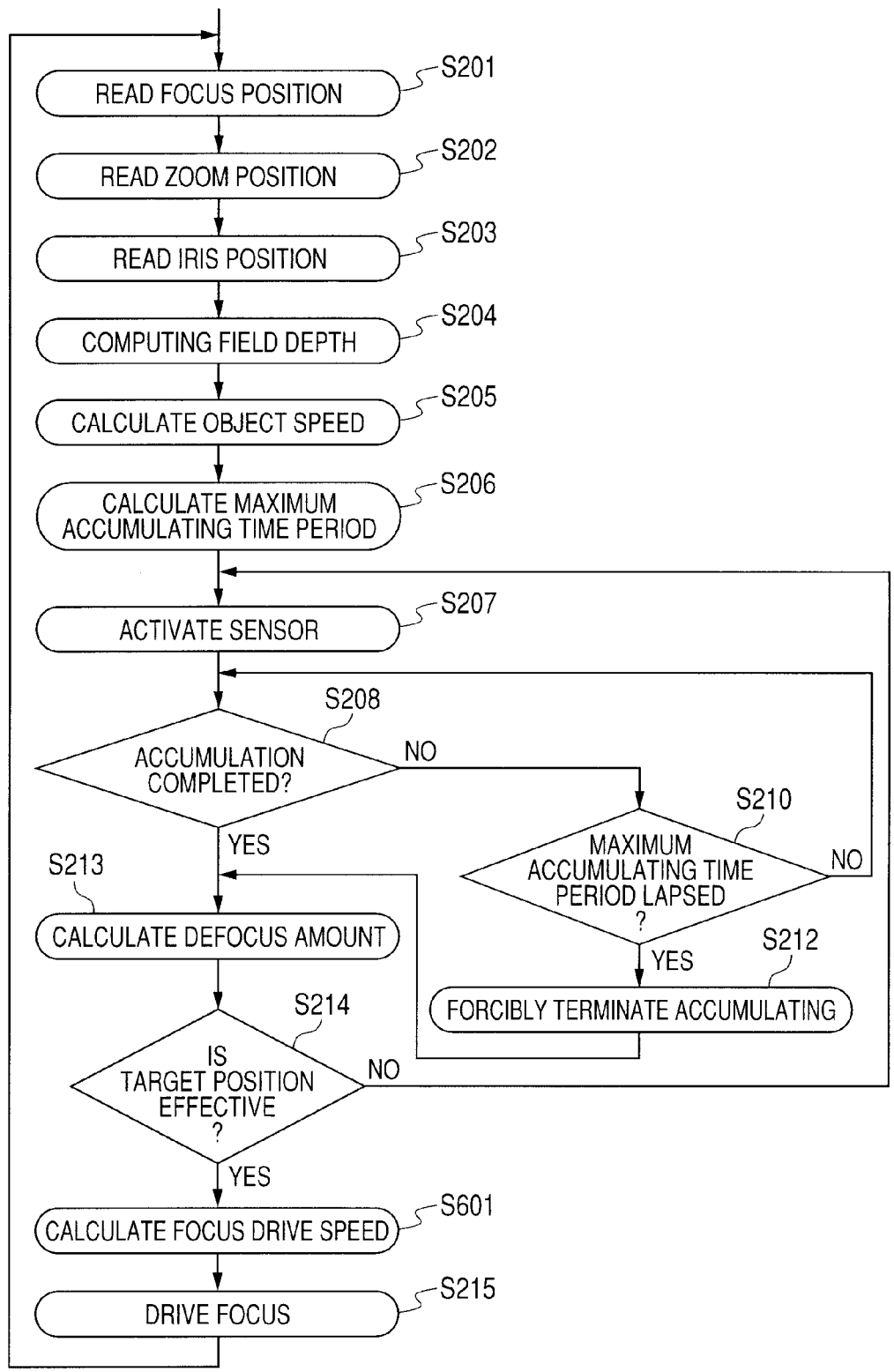
FIG. 7 is a flowchart of the third embodiment.
Figure 8:
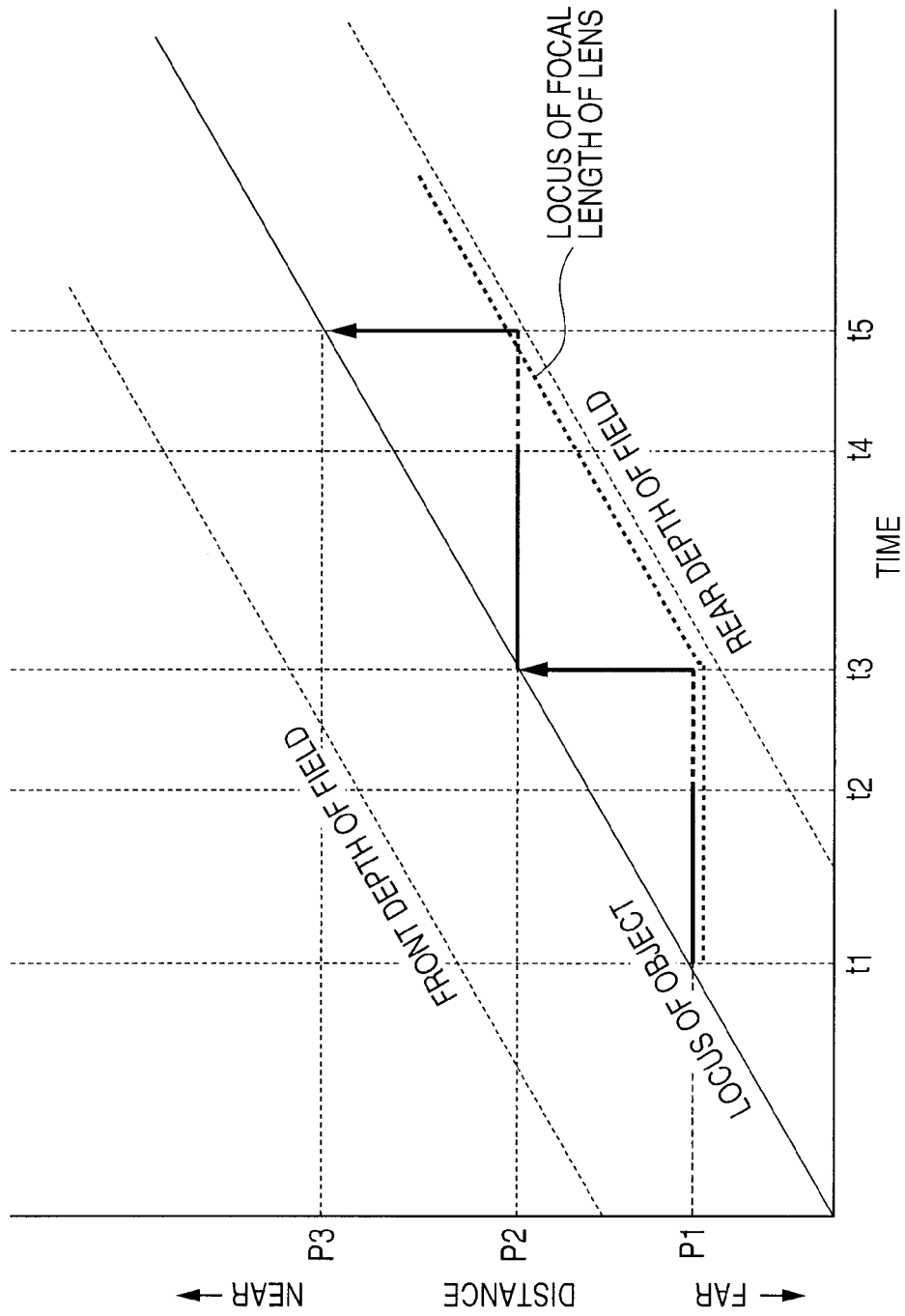
FIG. 8 is a locus of focal length of a lens to which the third embodiment is applied.
Figure 9:
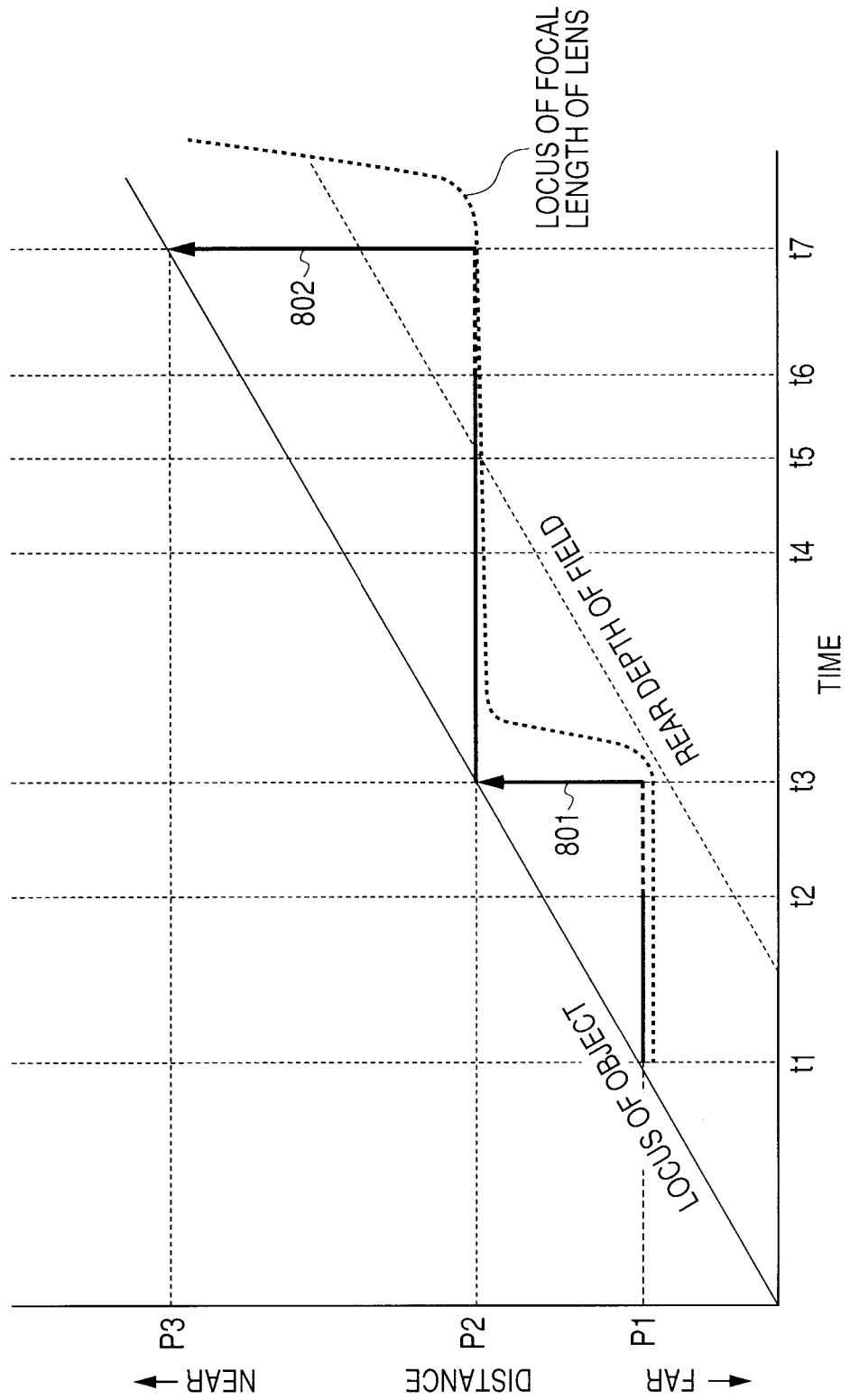
FIG. 9 is a locus of focal length of a conventional lens.

Operation in this configuration is described in detail with reference to a flowchart of FIG. 7 and a locus of focal length of a lens illustrated in FIG. 8. In FIG. 7, steps S201 to S214 are the same as those in the flowchart of the second embodiment illustrated in FIG. 5. Therefore, description of the steps is omitted. FIG. 8 shows a change in distance between a photographing lens and an object moving toward the photographing lens (moving upwardly in FIG. 8) as the time changes t1 to t5 and a change in distance in focus of the photographing lens (distance between the photographing lens and an object in focus) with respect to the time t1 to t5.

Processing in step S214 is the same as that in the second embodiment. However, when it is determined in step S214 that the focus drive amount is ineffective, the process returns to step S207 to activate the phase difference sensor again and star charge accumulation. When it is determined that the focus drive amount is effective in step S214, the process proceeds to step S601.

In step S601, when it is determined in the accumulation completion determination in step S208 that the charge accumulation is completed, the charge accumulating time period of the sensor is selected and, when it is determined that the charge accumulation is not completed, the maximum accumulating time period is selected. The focus drive speed calculation unit 402 sets drive speed of the focus lens (hereinafter referred to as focus drive speed) based on the defocus amount calculated in step S213 and the object speed calculated in step S205. As indicated by the locus of focal length of the lens illustrated in FIG. 8, the focus drive speed is set such that the focus lens moves by a focus drive amount corresponding to a defocus amount (P2−P1 illustrated in FIG. 8) by the next focus control period (t5 in FIG. 8). For example, the focus drive speed calculation unit 402 may set focus drive speed such that a drive amount corresponding to the defocus amount calculated in step S213 is obtained after a lapse of time of one of the charge accumulating time period and the maximum accumulating time period selected in step S601 after the focus lens starts to be driven. Alternatively, the focus drive speed may be set such that a drive amount corresponding to the defocus amount is obtained after a lapse of time equivalent to a sum of one of the charge accumulating time period and the maximum accumulating time period selected in step S601 and defocus amount calculation time period (FIG. 8).

In step S215, the focus lens is driven according to the focus drive speed calculated in step S601. After starting the drive of the focus lens in step S215, the process returns to step S201 and repeats the series of operation.

As described above, according to this embodiment, the focus lens can be driven according to the moving speed of the object. Therefore, it is possible to perform smooth focus adjustment.

The exemplary embodiments of the present invention have been described. However, the present invention is not limited to the embodiments. Various modifications and alterations of the embodiments are possible without departing from the gist of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-110868, filed Apr. 30, 2009, which is hereby incorporated by reference herein in its entirety.

What is claimed is:

1. An automatic focusing apparatus comprising:
    a focus detection unit that photoelectrically converts at least a part of a photographing light beam;
    a defocus computing unit that calculates a defocus amount on the basis of an output of the focus detection unit;
    a drive unit that drives a focus lens on the basis of the defocus amount;
    a unit that sets a maximum accumulating time period that can be consumed for accumulation of charges in the focus detection unit;
    an object speed calculation unit that calculates an object speed;
    a measuring unit that measures focus detection time period; and
    a drive speed calculation unit that calculates a drive speed of the focus lens based on the object speed and the focus detection time period, wherein
    when an accumulation amount of charges in the focus detection unit reaches a threshold value within the maximum accumulating time period, at a time when the accumulation amount of charges in the focus detection unit reaches the threshold value, the defocus computing unit calculates a defocus amount using an output of the focus detection unit and outputs the defocus amount to the drive unit,
    when the accumulation amount of charges in the focus detection unit does not reach the threshold value within the maximum accumulating time period, at a time when the maximum accumulating time period lapses, the defocus computing unit calculates a defocus amount using an output of the focus detection unit and outputs the defocus amount to the drive unit, and the focus lens is driven on the basis of the drive speed.

2. An automatic focusing apparatus comprising:

a focus detection unit that photoelectrically converts at least a part of a photographing light beam;

a defocus computing unit that calculates a defocus amount on the basis of an output of the focus detection unit;

a drive unit that drives a focus lens on the basis of the defocus amount;

a unit that sets a maximum accumulating time period that can be consumed for accumulation of charges in the focus detection unit;

an object speed calculation unit that calculates an object speed;

a measuring unit that measures focus detection time period; and an extrapolation drive computing unit that calculates an extrapolation drive amount of the focus lens based on the object speed an the focus detection time period, wherein when an accumulation amount of charges in the focus detection unit reaches a threshold value within the maximum accumulating time period, at a time when the accumulation amount of charges in the focus detection unit reaches the threshold value, the defocus computing unit calculates a defocus amount using an output of the focus detection unit and outputs the defocus amount to the drive unit, when the accumulation amount of charges in the focus detection unit does not reach the threshold value within the maximum accumulating time period, at a time when the maximum accumulating time period lapses, the defocus computing unit calculates a defocus amount using an output of the focus detection unit and outputs the defocus amount to the drive unit, and the focus lens is driven on the basis of the extrapolation drive amount when the accumulation amount of charges in the focus detection unit does not reach the threshold value within the maximum accumulating time period and the defocus computing unit cannot calculate a defocus amount.

3. The automatic focusing apparatus according to claim 1, wherein the drive speed calculation unit calculates the drive speed with which a focus drive amount corresponding to the focus amount is obtained after the focus detection time period lapses after the focus lens starts to be driven.

* * * * *